US006892361B2

(12) United States Patent
Kandogan

(10) Patent No.: US 6,892,361 B2

(45) Date of Patent: May 10, 2005

(54) TASK COMPOSITION METHOD FOR COMPUTER APPLICATIONS

(75) Inventor: Eser Kandogan, Mountain View, CA (US)

(73) Assignee: International Business Machines Corporation, Armonk, NY (US)

(*) Notice: Subject to any disclaimer, the term of this patent is extended or adjusted under 35 U.S.C. 154(b) by 568 days.

(21) Appl. No.: 09/900,734

(22) Filed: Jul. 6, 2001

(65) Prior Publication Data

US 2003/0007005 A1 Jan. 9, 2003

(51) Int. Cl.[7] .................................................. G09G 5/00

(52) U.S. Cl. ....................... 715/837; 715/853; 715/764; 715/835; 715/967; 715/966

(58) Field of Search ................................ 345/837, 853, 345/771, 763, 835, 967, 781, 839

(56) References Cited

U.S. PATENT DOCUMENTS 5,623,592 A * 4/1997 Carlson et al. ............. 345/866
5,767,852 A * 6/1998 Keller et al. ................ 345/835
6,324,498 B1 * 11/2001 Wajda ......................... 703/25

OTHER PUBLICATIONS

R. C. Bodner et al., "Using Animated Icons to Present Complex Tasks," Proceedings of CASCON, 1997, pp. 281–291.

J. G. Bonar et al., "A Visual Programming Language for Novices." In S.–K. Chang (Ed.), *Principles of Visual Programming Systems*, Prentice Hall, 326–366 (1990).

E. P. Glinert, "Out of Flatland: Towards 3–D Visual Programming." In Visual Programming Environments: Applications and Issues, IEEE Computer Society Press, 547–554 (1990).

J. A. Johnson et al., "The Desktop Metaphor as an Approach to User Interface Design," Proc. ACM Annual Conference on the Range of Computing, 1985, pp. 548–549.

R. Mander et al., "A 'Pile' Metaphor for Supporting Casual Organization of Information," Proc. ACM SIGCHI, 1992, pp. 627–634.

B. Shneiderman, "Designing the User Interface: Strategies for Effective Human–Computer–Interaction, 3$^{rd}$ Edition, Chapter 6, Direct Manipulation and Virtual Environments," pp. 184–233, 1998.

J. M. Spool et al., "Designing for Complex Products," Proc. ACM SIGCHI, Tutorials, 1995, pp. 395–439.

"Access/Control Icons (Icon Keys)," IBM Technical Disclosure Bulletin, Apr. 1995, pp. 407–410.

* cited by examiner

*Primary Examiner*—Cao (Kevin) Nguyen
*Assistant Examiner*—Michael Roswell
(74) *Attorney, Agent, or Firm*—Daniel E. Johnson

(57) ABSTRACT

Jigsaw connector pieces representing tasks to be performed are displayed on a computer screen, preferably hierarchically in a tree, to elucidate the relationships between tasks. To perform a task, a user positions an attachment jigsaw piece next to its corresponding connector piece. The user is then prompted to input or verify preferences in a properties panel. For example, a printer may be installed by interconnecting an attachment piece (corresponding to the printer to be installed) next to the printer connector piece in the tree. The user may be aided in the process of matching connector and attachment pieces through the use of matching colors and images on the pieces.

31 Claims, 10 Drawing Sheets

Tree 148
Properties Panel 152
144
Toolbar 140

TASK COMPOSITION METHOD FOR COMPUTER APPLICATIONS

TECHNICAL FIELD

The invention is in the field of computer/user interfaces. More particularly, the invention relates to methods that facilitate a user's ability to complete tasks.

BACKGROUND

The applications commonly run on computers have increased in complexity to the point that users are often forced to deal with procedures that can be quite complex and involve long sequences of steps. The installation of a computer printer, for example, can be quite cumbersome and may involve significant user input. Unfortunately, the interfaces with which a user must work to run an application are not necessarily easy to learn and use.

Windows, Icon, Menu, Pointer (WIMP) interfaces have dominated interface technology for over two decades. They surpassed their predecessors in terms of ease of use, primarily due to the application of direct manipulation interface techniques (see, for example, B. Shneiderman, *Designing the user interface: strategies for effective human-computer-interaction,* 3rd edition, Chapter 6, "Direct manipulation and virtual environments", pp. 184–233, 1998). WIMP interfaces, which typically rely on the "point and click" technique, facilitate direct physical actions on objects (i.e., icons or any other visual representation) related to tasks to be performed, leading to increased productivity and improved usability. Over the years WIMP interfaces have been improved in many ways. The desktop metaphor (see, for example, J. A. Johnson et al., "The desktop metaphor as an approach to user interface design", Proc. ACM Annual Conference on the Range of Computing, pp. 548–549, 1985) supplemented direct manipulation interfaces by providing a familiar organization style that relied upon recognition rather than recall of the specific task names. Also, animated icons have been proposed as a technique for presenting complex tasks to users by animating between pre- and post-task representations of objects (see, for example, R. C. Bodner et al., "Using animated icons to present complex tasks", Proceedings of CASCON, pp. 281–291, 1997).

However, tasks in many currently run applications are more complex than what the desktop metaphor may suggest. They typically involve long sequences of steps, and may involve a number of different objects. Attempting to address such demands, developers have introduced task wizards, which have rapidly become the de-facto solution to this problem of task complexity. Wizards are basically sequences of dialogs that guide users in their tasks. They are, however, a deviation from accomplishing tasks through the direct manipulation of objects, and can result in usability problems (see, for example, J. M. Spool et al., "Designing for Complex Products," Proc. ACM SIGCHI, Tutorials, pp. 395–399, 1995). Users often flounder during some task wizards and hit dead ends due to missing prerequisites. This may cause them to switch frequently among alternatives, explore a number of options, and become frustrated. At the end of the process, users typically have trouble verifying that they have completed the task properly since task wizards manipulate objects indirectly. In addition, users may be unaware of any unintended side effects of canceling certain operations or going back while working through the wizard's dialogs. In some sense, wizards may be regarded as a step backwards from the principles of direct manipulation of objects, reversible actions, and continuous feedback. These problems have even led some to question the applicability of direct manipulation interfaces to complex applications. There clearly remains a need for a more usable approach to interacting with applications.

To this end, methodology is disclosed herein in which jigsaw pieces representing tasks are arranged hierarchically in a tree. This methodology differs significantly from the widget metaphors of, for example, Glinert who in his BLOX visual programming language represented imperative programming constructs (e.g. IF, THEN, ELSE, WHILE, etc.) using jigsaw-like tiles that can be stitched together to create program fragments, and Bonar et al., who described a visual programming language called BridgeTalk, in which constructs are implemented as icons that can be picked, manipulated, placed, and connected together. (See P. E. Glinert, "Out of flatland: Towards 3-d visual programming", Visual Programming Environments: Applications and Issues, IEEE Computer Society Press, pp. 547–554, 1990; and Bonar et al., "A visual programming language for novices", in Principles of Visual Programming Systems, S.-K. Chang, Ed., Prentice Hall, pp. 326–366, 1990). Furthermore, the methodology herein differs from that disclosed in the IBM April 1995 Technical Disclosure Bulletin "Access/Control Icons". For example, these references do not disclose the hierarchical organization of jigsaw pieces, and, in addition, the user is not prompted for input or information necessary for the completion of a task after the corresponding jigsaw pieces have been brought together.

SUMMARY OF THE INVENTION

Computer applications are made more usable by enriching the visual language of direct manipulation interfaces so that they yield not only more expressive power but are also easier to learn and more usable. To this end, "jigsaw puzzle" type pieces arranged hierarchically in a tree are used to facilitate task composition suitable for complex applications.

In the jigsaw tree embodiments herein, task details are conveyed to the user through a visual plan represented by a jigsaw tree detailing the objects users need to perform their tasks. The visual plan places the objects in part of a bigger puzzle, thereby depicting the relationships among objects and what users have to do to complete the task. This gives users flexibility as to how to approach the problem at hand. It also offers flexible assistance without enforcing a specific sequence of steps as wizards do. Each new task extends the existing hierarchy with new pieces, thus eliminating repetitions by reusing existing structure unlike wizard approaches. The jigsaw tree approach also allows users to learn the application more effectively through direct manipulation. While it supports novice users in planning and performing their tasks, it also supports expert users through copy, paste, and drop operations that facilitate reuse.

One implementation of the invention is a method of performing a task in a processor-based system that includes a monitor and a user input device for controlling information displayed on the monitor. The method includes displaying on the monitor a plurality of connector pieces representing respective tasks to be completed, in which the pieces are arranged in a tree reflecting a hierarchy of tasks. A plurality of attachment pieces are displayed on the monitor, in which each of the attachment pieces is configured to interconnect with at least one of the connector pieces. The method includes using the user input device to position one of the attachment pieces and one of the connector pieces in close proximity with each other on the monitor, with this positioning indicating a desire on the part of a user to complete the task. The method also includes inputting into the processor information necessary to perform the task, in which the user is prompted for this information following the proximity positioning.

In a preferred implementation of the method, the inputting may include confirming default settings from the processor. In another preferred implementation, the positioning results in said one of the attachment pieces and said one of the connector pieces appearing interconnected. In still other implementations, said one of the attachment pieces and said one of the connector pieces may advantageously have matching images thereon or matching colors, and said one of the attachment pieces and said one of the connector pieces preferably have respective contours that substantially match when they are interconnected. The positioning may include moving said one of the attachment pieces from one part of the tree to another part of the tree. In preferred implementations, said one of the attachment pieces may be selected from a menu or from a toolbar on the monitor. The tree may include one or more subtrees, with the tree and subtrees having respective connector pieces that have different shapes, in which the attachment pieces include pieces that interconnect with said tree connector piece and said subtree connector piece, respectively. The positioning of said one of the connector pieces and said one of the attachment pieces may include initially placing said one of the attachment pieces next to a piece other than said one of said connector pieces, in which said one of said attachment pieces is then repositioned to appear interconnected with said one of the connector pieces. In certain implementations, one of the connector pieces itself includes interconnected pieces.

Another implementation of the invention is a processor-implemented method of performing a task. This method includes displaying a first piece on a monitor connected to a processor, in which the first piece is positioned within a tree that includes a plurality of pieces, and the first piece represents a task to be performed. The method also includes displaying a second piece on the monitor, in which the second piece is configured to interconnect with the first piece, the first and second pieces having respective contours that substantially match when they are interconnected. The first and second pieces on the monitor are positioned in close proximity to each other, with this positioning indicating a desire on the part of a user to perform the task. The method also includes inputting into the processor information necessary to performing the task, in which the user is prompted for said information following said positioning.

Yet another implementation of the invention is a method of creating a visual representation of a task to be performed. The method includes displaying on a monitor a first set of pieces arranged in a tree, in which the pieces correspond to tasks to be performed, and wherein the pieces are designed to mate with respective counterpart pieces. The method also includes displaying an additional piece on the monitor, and creating a piece in the tree that acts hierarchically as a parent to the additional piece.

In preferred embodiments of the invention, there are provided computer program products comprising computer readable media, in which the media include machine-readable instructions for carrying out the methods disclosed herein.

DETAILED DESCRIPTION OF THE INVENTION

Figure 1:
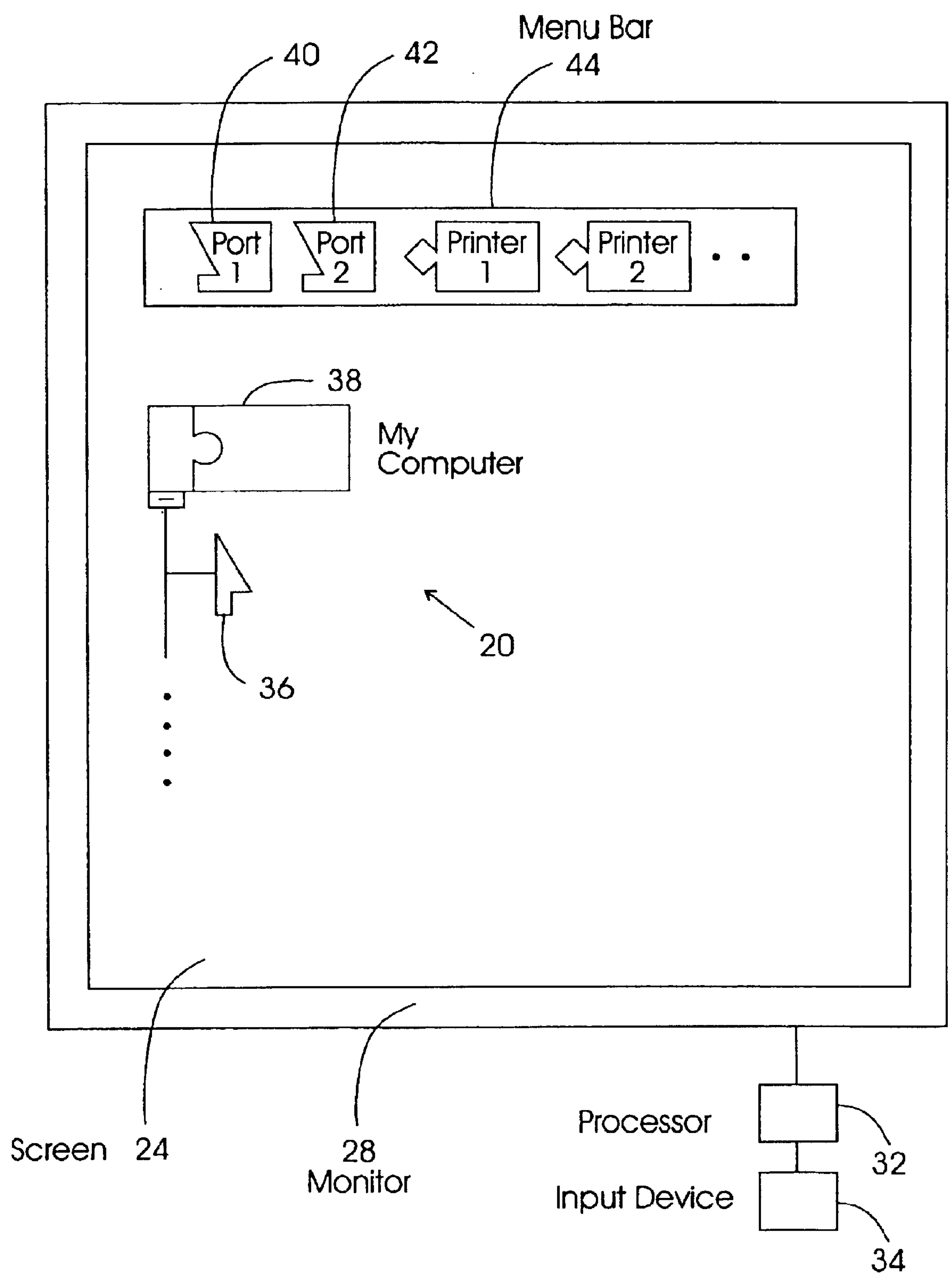
FIG. 1 shows an implementation of the invention, in which a hierarchical tree is shown on the screen of a monitor, with certain jigsaw pieces within the tree representing tasks to be completed and other jigsaw pieces being used to initiate completion of those tasks.
Figure 2:
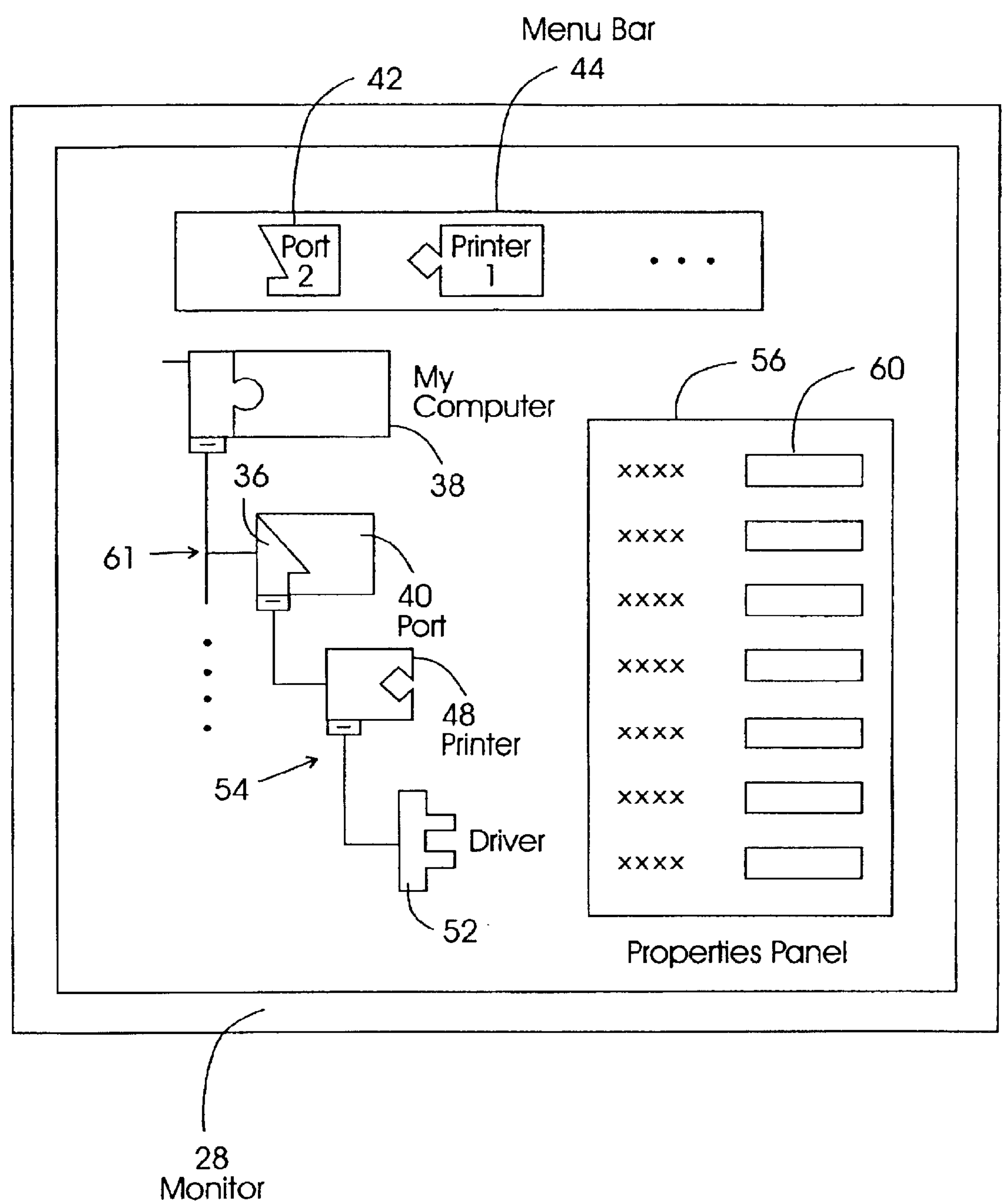
FIG. 2 shows how selection of a port generates connector pieces corresponding to the tasks of selecting a printer and a driver, respectively.

In preferred embodiments of the invention, an icon configured as a jigsaw piece represents a connector type for which there is an associated task to be completed, and another (one or more) icon configured as a matching jigsaw piece is used to initiate completion of that task. FIG. 1 shows a portion of a hierarchical "jigsaw" tree 20, including several jigsaw pieces displayed on a screen 24 of a monitor 28. The monitor 28 is tied to and receives inputs from a processor 32 or computer. (The processor 32 and its associated user input or interaction device 34 are shown only in FIG. 1 for clarity.) A jigsaw piece 36 stands ready to receive a mating piece 40 representing a first port (or alternatively a piece 42 representing a second port) from a menu or a tool bar 44. In this particular example, the piece 36 represents a hardware port ("port 1") that must be configured, and the piece 36 has as its "parent piece" a completed piece 38 designating the computer's system. In general, a jigsaw piece such as the piece 36 could represent a type of connector, such as a hardware port or a software process (such as a web application, servlet engine, or network protocol). The user selects the mating piece 40 from the tool bar 44 to bring the mating piece 40 next to the piece 36, as shown in FIG. 2. The mating piece 40 advantageously includes a textual label (such as the word "port") or another visual label that identifies it as a piece that initiates configuration of the port when mated with the piece 36. The pieces 36 and 40 advantageously automatically snap or interconnect with each other when a user brings the piece 40 close to its counterpart 36 (e.g., the pieces 36 and 40 preferably having matching contours), resulting in the pieces 36 and 40 being depicted on the monitor 28 in an interlocked or interconnected state. (Less preferably, the pieces 36 and 40 may simply be left positioned in close proximity to each other, with the user recognizing nevertheless that they represent a matched pair.) Pieces may be selected using the interaction device 34 such as a mouse or keyboard. Standard GUI functions may be advantageously used such as selecting single or multiple pieces by clicking on them followed by deleting, copying, pasting, or renaming them. To select all pieces along a certain path in the tree hierarchy, the user may click on the first element of the path and SHIFT-click on the last piece in the path.

The piece 36 can be regarded as a task to be completed (configuring the port), or alternatively, the act of placing the piece 40 next to the piece 36 (resulting in their interconnection) can be regarded as initiating the configuration process. In preferred embodiments, matching pairs of pieces (such as pieces 36 and 40) may use color or images to aid the user in the matching process, e.g., the pieces 36 and 40 may both be colored green, or they may have matching background images thereon (not shown) that form a continuous, integrated image when the pieces are interconnected. Jigsaw pieces having multiple irregularities or protrusions to them may make them more easily distinguishable from other pieces.

Interconnecting the pieces 36 and 40 in this example generates two additional pieces 48 and 52 (in a subtree 54), representing the tasks of selecting a printer (for the port 1) and a driver for that printer, respectively. Furthermore, interconnecting the pieces 36 and 40 advantageously generates a properties panel 56 that may include one or more boxes 60 into which the user inputs information. For example, in one of the boxes 60 the user may input the port type, in another the name of the server, and in another the print queue, and so on. (Alternatively, the user may be asked to verify default settings in one or more boxes, in which the defaults are given by the processor 32 or the computer.)

Likewise, when pieces selected from the tool bar 44 are interconnected with the pieces 48 and 52, properties panels (not shown) corresponding to the printer and driver, respectively, are displayed. The piece 48 can be regarded as a task to be completed (namely, installing a printer), and the act of placing a matching piece next to the piece 48, resulting in their interconnection, can be regarded as initiating the printer setup process. (In preferred implementations, the user may advantageously select from one of many pieces on the tool bar 44 representing different printers. Likewise, there may be several pieces (not shown) on the toolbar 44 representing different drivers.) A properties panel for a printer may advantageously include a box for the make and model of the printer to be interfaced with the computer, and in another box the paper size(s) may be set. More than one matching piece for the piece 48 may be displayed on the tool bar 44, so that the user may select from more than one printer.

Thus, a properties panel prompts the user to input information (which may include confirming default settings) in a convenient and comfortable manner. When a piece is mated with a corresponding piece, such as mating the pair of pieces 36 and 40, the user is thereby provided with a visual indication that the particular task represented by the pair has either been completed or, if a properties panel is displayed, is in the process of being completed. Likewise, a task may be undone (reversed) by removing a matching piece from its counterpart, e.g., port 1 may be deselected by dragging the piece 40 away from the piece 36. Thus, in the example of FIGS. 1 and 2, a convenient method of interfacing a port with hardware (devices, such as printers and modems) is presented.

Each of the nodes 61 of a hierarchical tree represents a point for a jigsaw piece, in which the various nodes are linked through lines representing the tree, as seen for example in FIG. 2. A jigsaw tree can be thought of as an unordered tree with a single "root" piece that may have associated "children" pieces, in which each of the children also represents a subtree. A tree generally includes connector-attachment pairs (e.g., pieces 36 and 40, respectively). In the embodiments described herein, the pieces have only single connectors and their corresponding attachments have no children.

Figure 3:
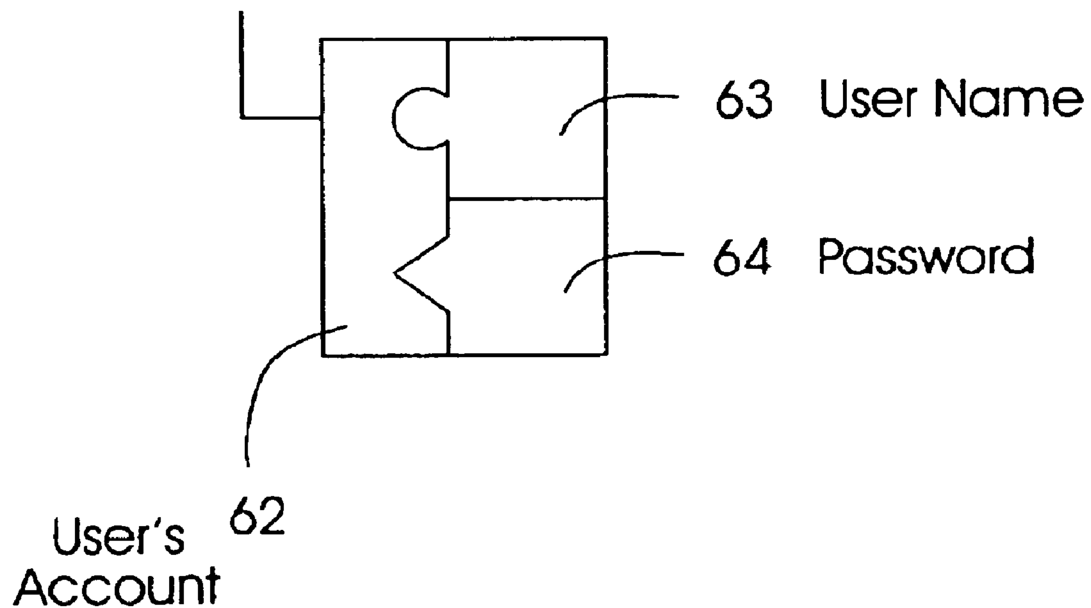
FIG. 3 shows a more complicated connector piece that is configured to receive 2 attachment pieces.
Figure 4:
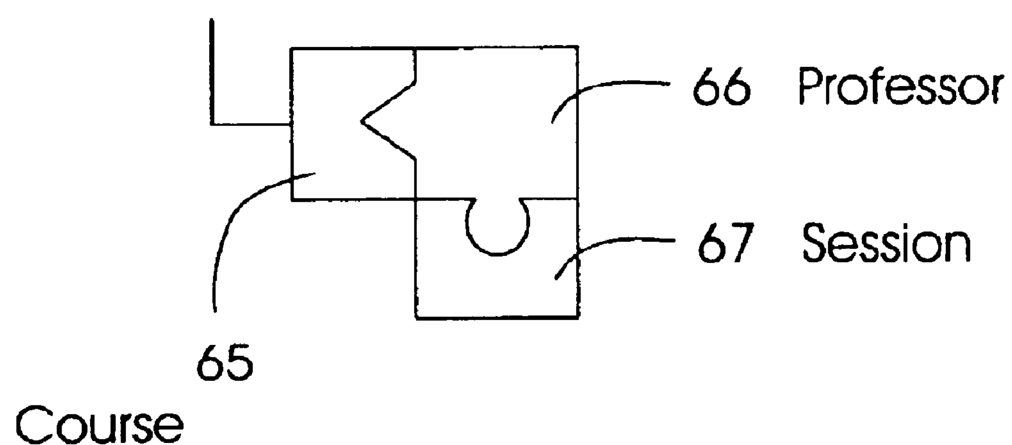
FIG. 4 shows a connector piece designed to receive an attachment piece, with the attachment piece in turn configured to receive another attachment piece.

The "jigsaw" pieces herein offer advantages over conventional icons with respect to their expressive capabilities and richness of interaction. Firstly, the visual design of the jigsaw pieces suggests which pieces will match or interconnect with each other. Secondly, pieces can be attached for a period of time and removed later. For example, the port 1 can be deselected by removing the mating piece 40. (Likewise, a printer can be uninstalled in an analogous fashion by removing the appropriate mating attachment piece.) Thirdly, more complicated pieces having highly irregular features such as protrusions and/or holes can be used to represent tasks requiring more than one object, thereby supporting richer interactions. For example, as illustrated in FIG. 3, a jigsaw piece 62 representing a user's account is contoured to receive both a jigsaw piece 63 representing a user name and a piece 64 representing a password. In this case, the user may interconnect the pieces 62 and 63 to form a larger piece that is then connected with the piece 64. Fourthly, pieces may support complex tasks by visual composition of many jigsaw pieces into more complex forms. As illustrated in FIG. 4, a jigsaw piece 65 representing an academic course is contoured to first receive a piece 66 representing a professor. The piece 66 in turn receives a piece 67 representing a session taught by that professor.

The jigsaw tree 20 takes advantage of the structural capabilities of conventional trees: subtrees 54 can be advantageously collapsed and expanded, deleted, copied, and pasted to other parts of the tree. This manipulation of subtrees may be particularly useful in the context of a system administrator application, in which a number of computers are involved. In this case, the root piece could be designated as a computer domain consisting of a number of computers. By copying a subtree out of a single computer, the system administrator can configure a number of computers at once.

Figure 5A:
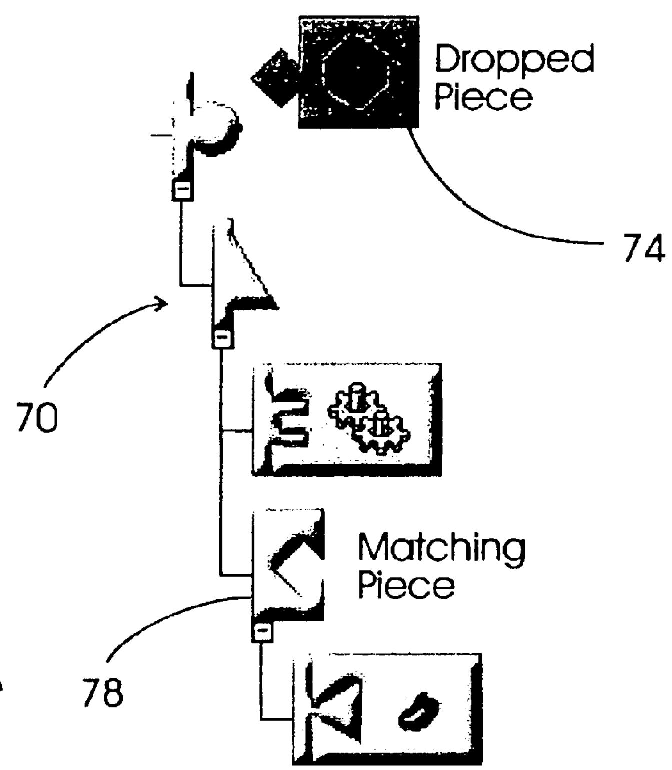
FIGS. 5A and 5B illustrate how "dropping" a selected piece onto a tree results in the dropped piece working its way down the tree until a suitable match is found.
Figure 5B:
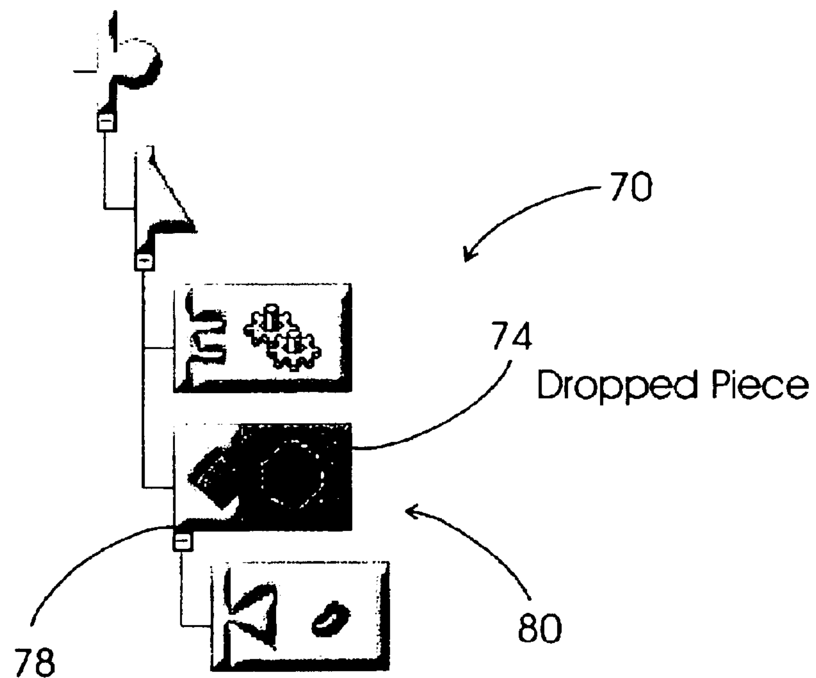

In addition, pieces selected from the toolbar 44 or menu can be advantageously dragged and dropped, so that they automatically attach themselves to appropriate pieces on the tree 20. A piece selected from the toolbar 44 may attach itself to a piece (e.g., piece 36) next to which it is placed or dropped, as shown in FIGS. 5A and 5B. FIG. 5A shows a tree 70 onto which a user has "dropped" an attachment piece 74. The piece 74 is associated with a matching connector piece 78 within the tree 70. After the piece 74 is dropped, it works its way down the tree to mate with the matching piece 78. The pieces 74 and 78 thereby form an interconnected pair 80 as shown in FIG. 5B. The attachment piece 74 may later be removed from the connector piece 78 by dragging the piece 74 away, leaving the piece 78 behind.

The jigsaw tree 20 is preferably not so large that the number of pieces presents recall problems for the user, e.g., when the tree becomes too large to fit into the viewer's window and scrolling becomes necessary. However, this issue can be mitigated somewhat by collapsing and expanding subtrees. Additionally, the visual distinction between the connector and attachment pieces (e.g., the left hand piece 36 and the right hand piece 40 shown in FIG. 2) should be sufficiently clear that the user is unlikely to be confused between them. Also, if the complexity of the visual properties of the jigsaw pieces (in terms of how irregular their contours are) is too great, then the user may have difficulty in rapidly recognizing matching pieces from among all those pieces shown on the tool bar 44.

Figure 6A:
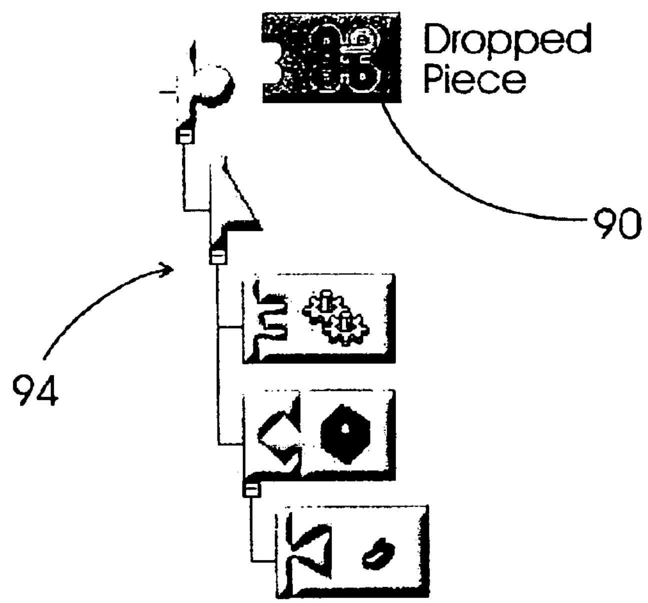
FIGS. 6A and 6B show how an intermediate piece can be created if a dropped piece has no matching piece in a tree.
Figure 6B:
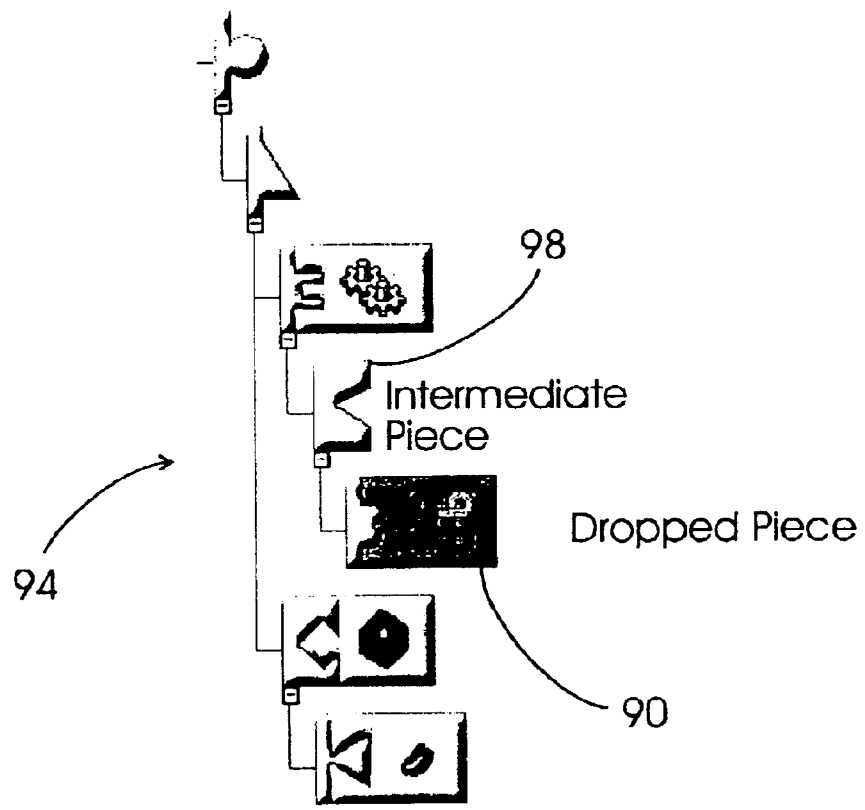

FIGS. 6A and 6B depict an example in which a piece 90 is dropped onto a tree 94, but the piece 90 has no matching pieces in the tree. In this case, an intermediate piece 98 is created, in which the intermediate piece 98 acts as a parent to the piece 90. Accordingly, the dropped piece 90 is placed underneath the piece 98 in its own subtree where the piece 90 functions as a child to the piece 98. Intermediate pieces are created based on the application-specific hierarchy. In the example of FIGS. 6A and 6B, the piece 90 may represent a printer to be installed (with a corresponding properties panel—not shown—popping up prompting the user for inputs), and the created intermediate piece 98 may represent the task of installing a port for that printer. The creation of an intermediate piece informs the user that completion of a desired task requires additional objects and communicates which types of objects are needed. Pieces in a tree having no associated counterparts indicate the existence of missing objects required for completion of the task.

Figure 7A:
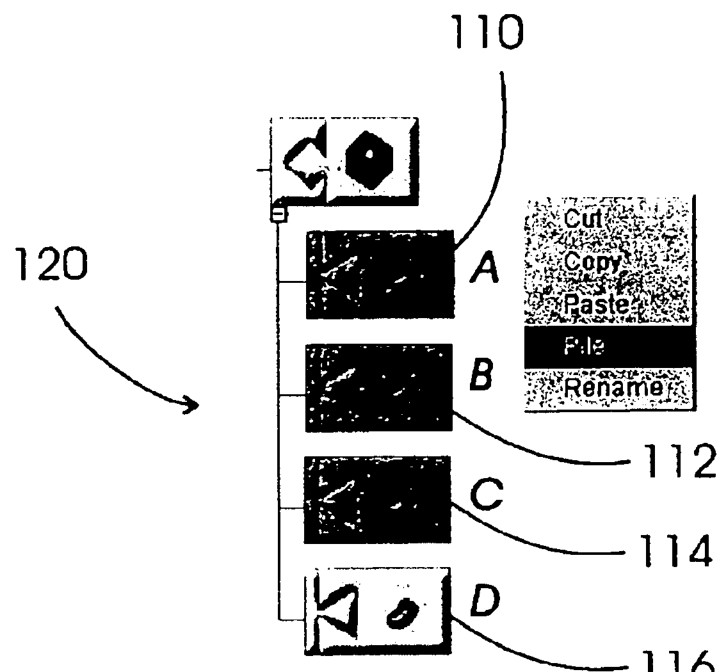
FIGS. 7A, 7B, 7C, and 7D illustrate how pieces within a tree can be stacked on top of each other or "piled".
Figure 7B:
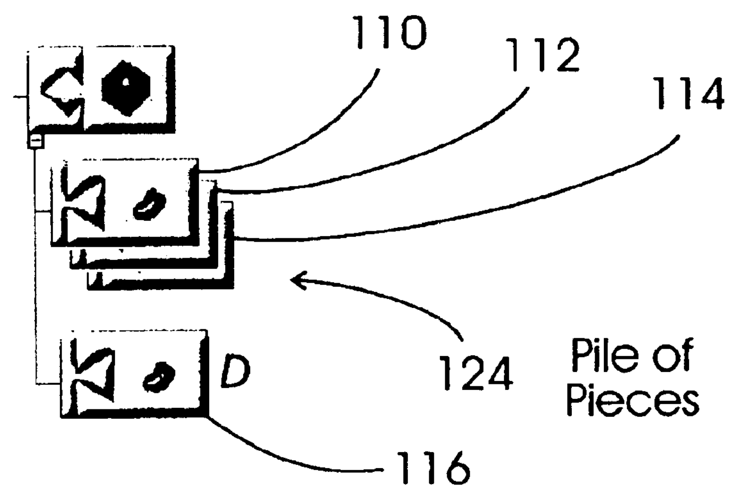
Figure 7C:
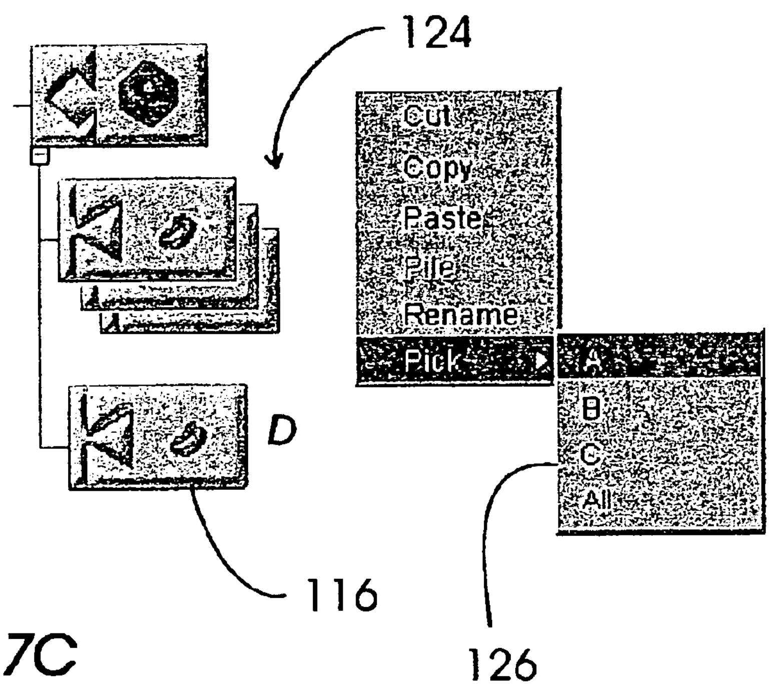
Figure 7D:
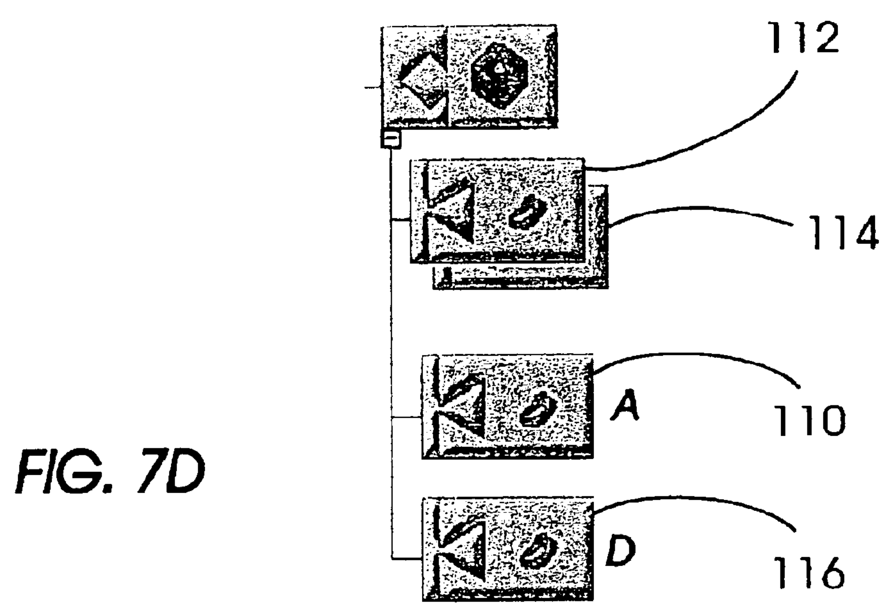

As shown in FIGS. 7A, 7B, 7C, and 7D "piles" may be used to represent groupings of pieces (see, for example, R. Mander et al., "A 'pile' metaphor for supporting casual organization of information", Proc. ACM SIGCHI, pp. 627–634, 1992). Piling helps to compact the representation without hiding the pieces completely. It works much like tree compaction, but it is preferably used only for sibling pieces (pieces having the same parent). In FIG. 7A a number of pieces 110 ("A"), 112 ("B"), 114 ("C"), 116 ("D") are shown in a tree 120. A user selects the pieces 110, 112, 114 and right-clicks on them to collect (group) them in a pile 124, as shown in FIG. 7B. As shown in FIGS. 7C and 7D, certain pieces may be extracted from the pile 124 by selecting their names from a pop-up menu 126. Pieces can be added to an existing pile by dragging and dropping them over the pile.

Complex applications such as system administration, human resources administration, procurement management, etc. may all lend themselves to use with the jigsaw tree embodiments disclosed herein. These applications typically have a hierarchy of objects of various types (e.g., installing a printer may involve the selection of a port, printer, and driver) and tasks having complex procedures, i.e., a number of steps involving many prerequisites. The jigsaw tree in such cases represents the hierarchy of application-specific objects, which are shown as jigsaw pieces. Tasks may be mapped to a hierarchy of jigsaw sub-trees.

To use a jigsaw tree in an application, designers should preferably 1) identify objects and their relationships to each other, 2) identify tasks and related objects, 3) create an application-specific hierarchy of objects, 4) design jigsaw pieces for objects, and 5) translate tasks into physical actions. A jigsaw tree for an application-server administration interface designed with these procedures in mind is now described. The jigsaw tree in this example replaces a wizard-style interface having 18 task wizards, some having as many as 9 steps. To this end, a hierarchy of server administration objects was compiled such as nodes, servers, applications, and servlets (nodes contain servers which contain applications). All tasks were examined to determine their prerequisite objects. For example, installing a servlet requires a servlet engine, a web application, an application server and a node.

Figure 8:
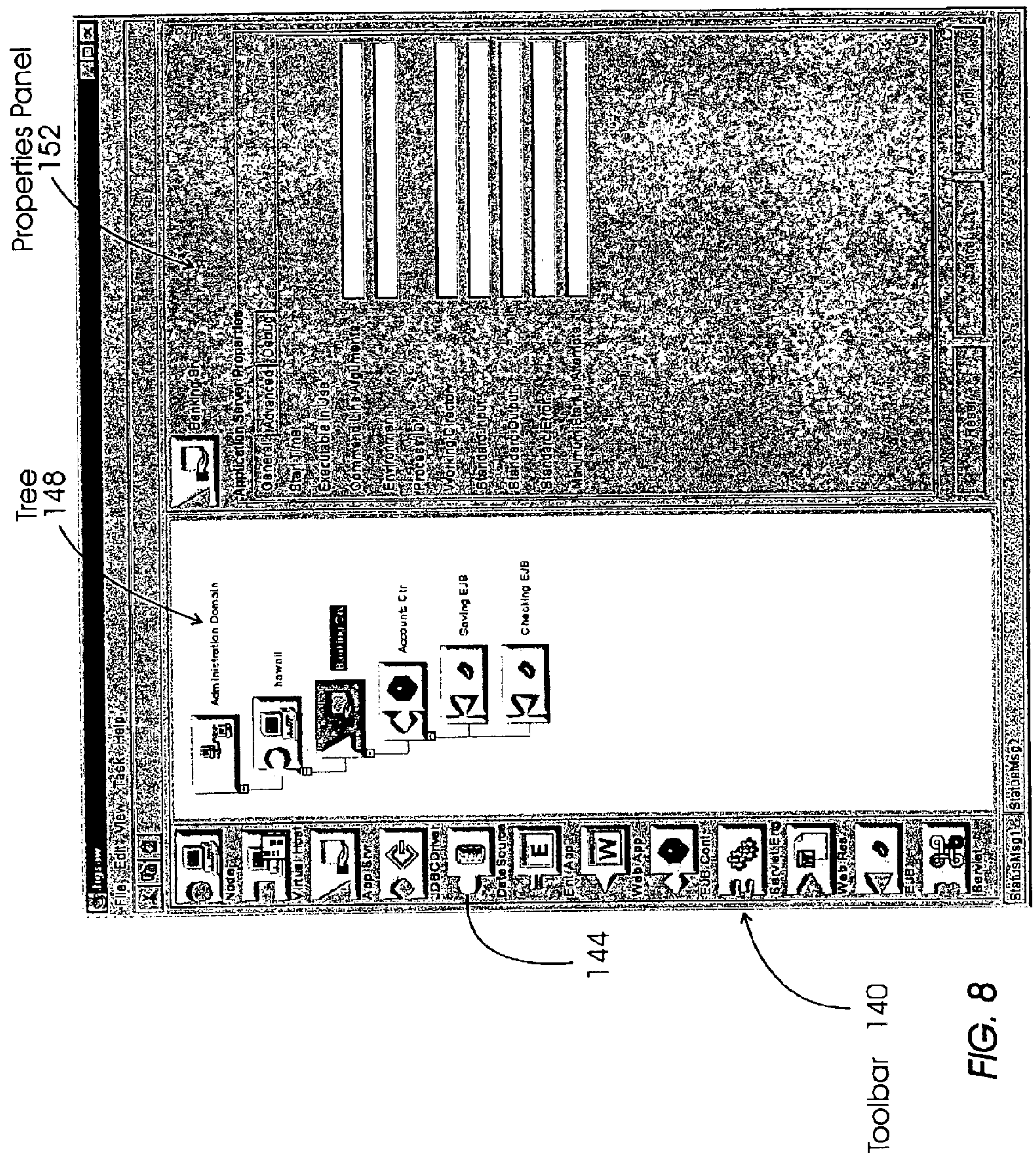
FIG. 8 shows another implementation of the invention directed to administration of an application server, showing a toolbar, a hierarchical tree, and a properties panel.

A suitably designed interface consists of three regions and is illustrated in FIG. 8: 1) a toolbar 140 for selecting jigsaw pieces 144; 2) a tree 148 showing the current hierarchy of objects, and 3) a properties panel 152 for further specification of the selected object properties. To add new objects into the administration domain, users select pieces from the toolbar 140, and drag and drop them onto the jigsaw tree 148. As pieces are added, the hierarchy of the objects changes, with intermediate pieces being created, if necessary, as described above. The user may then proceed to complete tasks by inserting missing pieces from the toolbar 140 and specifying properties by editing them in the properties panel 152.

Figure 9B:
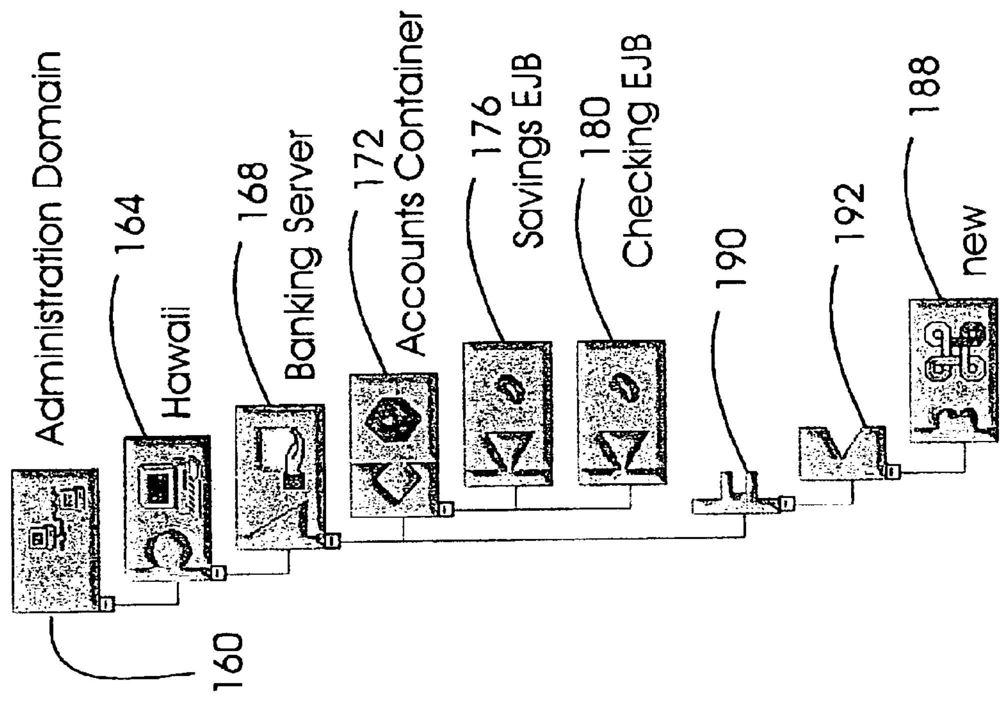
FIGS. 9A and 9B illustrate a sample task in the context of the administration of an application server, in which the addition of a new servlet to a tree results in the creation of connector jigsaw pieces for the web application and the servlet engine, respectively.
Figure 9A:
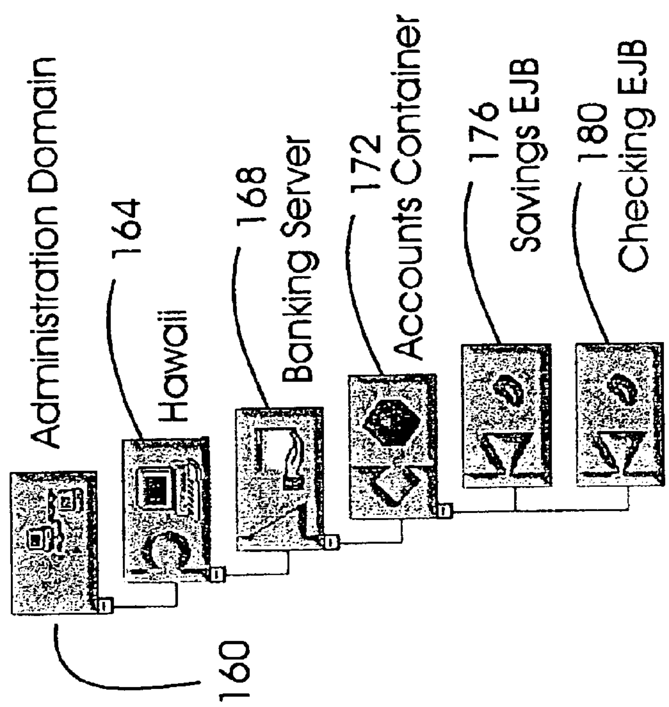

FIGS. 9A and 9B show a task of installing a new servlet. In this example, a piece 160 representing the top-level administration domain contains a node 164 (arbitrarily called "Hawaii") running an application server (called "Banking") represented by a piece 168. The server 168 contains an (Enterprise Java Bean) EJB Container (labeled "Accounts Container") represented by a piece 172, holding the EJBs labeled "Savings EJB" and "Checking EJB" represented by the pieces 176 and 180, respectively. To install the new servlet, the user drags a piece 188 representing the new servlet from the toolbar and drops it over the top-level administration domain piece 160. Correct installation of a servlet requires a hierarchy of objects such as a node, an application server, a web application, and a servlet engine. All of these are already present in FIG. 9A except for the web application and the servlet engine. As a result, when the new servlet piece 188 is dropped over the domain piece 160, two intermediate pieces are automatically created (as described above in connection with FIGS. 6A and 6B), namely, connector pieces 190 and 192 corresponding to the web application and the servlet engine, respectively. The addition of a new servlet would preferably also create intermediate pieces for the application server and the node had they not already been installed.

In a wizard-style interface, on the other hand, users must invoke the "install serviet" wizard, which requires that the web application contain the serviet However, if the user had not installed a web application previously, "create" and "configure web application" wizards would also be needed. In addition, "configure application server" and "create node" wizards may also be needed. The potential problem would be that a novice user might not be aware of these prerequisites before starting an "install serviet" wizard. The interface discussed above in connection with FIGS. 9A and 9B solves this problem by providing a user with a visual plan with jigsaw pieces. The jigsaw metaphor is thus useful, not only for representing the prerequisites for each task but also for showing them in their current state of the application or system.

The methodology herein may also be advantageously applied to the installation of an operating system, which typically involves many tasks that, in the wizard approach, requires the user to know about prerequisites, related objects, installation procedures, etc. The jigsaw approach herein may help in installing an operating system by providing a user with a visual plan showing options, prerequisites, etc., thereby facilitating the installation of the operating system with greater ease. Likewise, image processing (e.g., processing digital images) involves tasks such as applying various transformations, masks, etc., which similarly lend themselves to a jigsaw tree representation. Having a visual representation for these tasks allows the user to produce different digital images in a more efficient way by customizing the ordering of applications of transformations to an image and by updating the parameters to these transformations more easily.

In preferred embodiments of the invention, there is provided media encoded with executable program code to effect any of the methods described herein. These media may include a magnetic or optical disk or diskette, for example. In preferred embodiments, this program code may be read by a digital processing apparatus such as a computer for performing any one or more of the methods disclosed herein.

Figure 10:
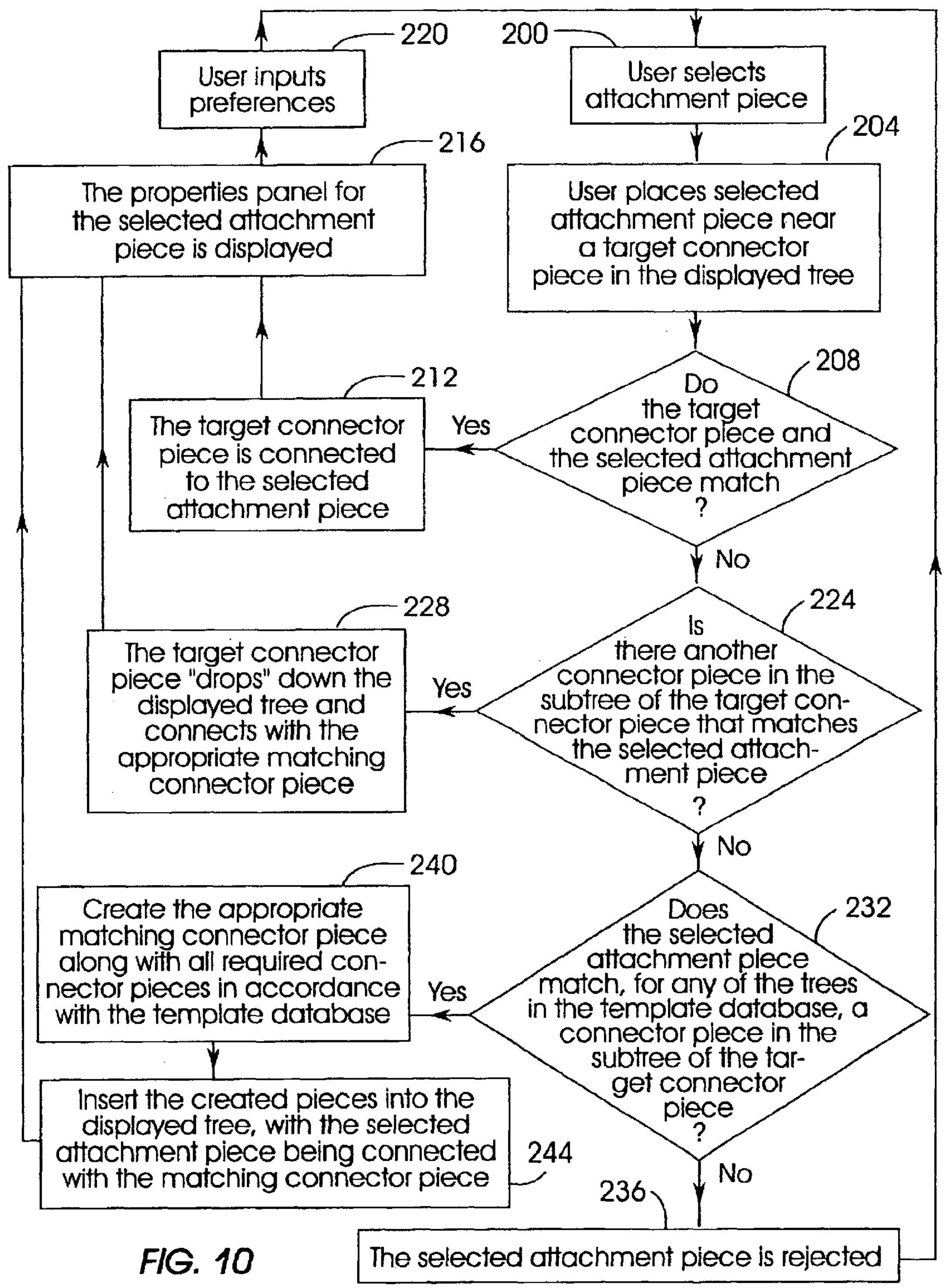
FIG. 10 shows a software flowchart illustrating some of the preferred implementations of the invention.

FIG. 10 illustrates in flowchart form the structure of software directed to some of the preferred methodology disclosed herein. A user selects an attachment piece, e.g., the piece 40 from the tool bar 44, as shown in step 200. The user then places the selected attachment piece near a target connector piece (e.g., the piece 36) in the currently displayed tree, as shown in step 204. A decision point 208 is then reached with respect to whether the selected attachment piece and the target connector piece match. If they do, then the target connector piece is connected to the selected attachment piece (as in step 212), resulting in the appropriate properties panel (e.g., the panel 56) being displayed (as in step 216). The user then inputs his or her preferences into the properties panel (e.g., into the boxes 60) and/or verifies default settings, as shown in step 220.

If, on the other hand, the target connector piece and the selected attachment piece do not match, then a decision point 224 is reached with respect to whether there is another connector piece in the subtree of the target connector piece that matches the selected attachment piece. (This situation is presented in FIG. 5A, for example, in which the dropped piece 74 does not match the target connector piece at the top of the tree 70.) If there is a matching connector piece in the subtree, then the selected attachment piece drops down the displayed tree and connects with this matching connector piece, as in step 228 (see FIG. 5B, for example). This results in the properties panel being displayed, as discussed above (step 216), and the user inputs his or her preferences (step 220). However, if there is not a matching connector piece in the subtree of the target connector piece, then a further decision point is reached (step 232), namely, does the selected attachment piece match a connector piece in any of the subtrees that could be constructed that would be of interest to the user in the context of his or her application? To this end, the processor advantageously accesses a database (not shown) of all such possibilities in the form of "template" trees representing the universe of such trees of interest. If no matching connector piece in this database is found, then the selected attachment piece is not accepted, and the user must start the process over again (step 236)—but if such a matching piece is found in the database, then the appropriate matching connector piece along with all required (intermediate) connector pieces are created in accordance with the template tree database (step 240). These created pieces are inserted into the displayed tree (step 244), with the selected attached piece being connected with the newly created matching connector piece (as shown in FIG. 6B, for example). The properties panel is then displayed (step 216), with the user inputting his or her preferences (step 220).

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A method of performing a task in a processor-based system that includes a monitor and a user input device for controlling information displayed on the monitor, the method comprising:

displaying on the monitor a plurality of connector pieces representing respective tasks to be completed, the pieces arranged in a tree reflecting a hierarchy of tasks, wherein each of the connector pieces has a shape that i) corresponds to a type of task, and that ii) is different from the shape of connector pieces corresponding to a different type of task;

displaying a plurality of attachment pieces on the monitor, each of the attachment pieces being configured to interconnect with at least one of the connector pieces, wherein each of the attachment pieces has a shape that corresponds to a type of task, such that when the shape of a given connector piece matches the shape of a given attachment piece, then the given attachment piece corresponds to a way of completing the task represented by the given connector piece;

using the user input device so that one of the attachment pieces and one of the connector pieces are positioned in close proximity with each other on the monitor, said one attachment piece and said one connector piece having matching shapes that correspond to a particular task selected by a user to be completed, said proximity positioning indicating a desire on the part of a user to complete the particular task; and inputting into the processor information necessary to perform the particular task, wherein the user is prompted for said information following said positioning.

2. The method of claim 1, wherein said positioning results in said one of the attachment pieces and said one of the connector pieces appearing interconnected.

3. The method of claim 1, wherein said inputting includes confirming default settings from the processor.

4. The method of claim 1, wherein said one of the attachment pieces and said one of the connector pieces have matching colors prior to said proximity positioning, to aid the user in matching said one of the attachment pieces and said one of the connector pieces.

5. The method of claim 1, wherein said one of the attachment pieces and said one of the connector pieces have respective contours that substantially match when they are interconnected.

6. The method of claim 1, wherein said one of the attachment pieces and said one of the connector pieces have matching images thereon prior to said proximity positioning, to aid the user in matching said one of the attachment pieces and said one of the connector pieces.

7. The method of claim 1, wherein said one of the connector pieces itself includes interconnected pieces.

8. The method of claim 1, said positioning including initially placing said one of the attachment pieces next to a piece other than said one of said connector pieces, in which said one of said attachment pieces is then repositioned to appear interconnected with said one of the connector pieces.

9. The method of claim 1, said positioning including moving said one of the attachment pieces from one part of the tree to another part of the tree.

10. The method of claim 1, wherein the particular task represents the installation of a printer.

11. The method of claim 1, wherein said one of the attachment pieces is selected from a menu on the monitor.

12. The method of claim 1, wherein said one of the attachment pieces is selected from a toolbar on the monitor.

13. The method of claim 1, wherein a plurality of pieces are displayed in a piled, overlapping fashion.

14. The method of claim 1, wherein the tree includes at least one subtree, the tree and subtree having respective connector pieces having different shapes, and wherein the attachment pieces include pieces that interconnect with said tree connector piece and said subtree connector piece, respectively.

15. A processor-implemented method of performing a task, comprising:

displaying a first piece on a monitor connected to a processor, the first piece positioned within a tree that includes a plurality of pieces, the first piece representing a particular type of task to be performed, said plurality of pieces in the tree representing respective tasks to be completed, and wherein each of said plurality of pieces has a shape that i) corresponds to a type of task, and that ii) is different from the shape of a piece in the tree corresponding to a different type of task;

displaying a second piece on the monitor, wherein the second piece is configured to interconnect with the first piece, the first and second pieces having respective preselected contours that substantially match when interconnected, thereby indicating to a user of the method that the second piece represents a way of completing the particular task represented by the first piece;

displaying the first and second pieces on the monitor in close proximity to each other, said proximity displaying indicating a desire on the part of a user to perform the particular task; and inputting into the processor information necessary to perform the particular task, wherein the user is prompted for said information following said positioning.

16. A method of creating a visual representation of a task to be performed, comprising:

displaying on a monitor a first set of pieces arranged in a tree, the pieces corresponding to tasks to be performed, wherein the pieces are designed to mate with respective counterpart pieces corresponding to ways of completing those tasks, wherein each of the pieces in the tree has a shape that i) corresponds to a type of task, and that ii) is different from the shape of a piece in the tree corresponding to a different type of task;

displaying an additional piece on the monitor selected by a user to be a counterpart piece; and creating a piece in the tree, the created piece acting hierarchically as a parent to the additional piece, wherein the created piece is taken from a database and is inserted in the displayed tree in the event that there is no piece in the tree that matches the additional piece and the created piece is required in the tree as a parent to the additional piece, thereby communicating to the user that additional selections must be made.

17. A computer program product, comprising:

a computer readable medium, the medium including machine-readable instructions for carrying out the steps of the method of claim 1.

18. A computer program product, comprising:

a computer readable medium, the medium including machine-readable instructions for carrying out the steps of the method of claim 15.

19. A computer program product, comprising:

a computer readable medium, the medium including machine-readable instructions for carrying out the steps method of claim 16.

20. The method of claim 1, wherein the method is used to install an operating system of a computer.

21. The method of claim 1, wherein the method is used in an application selected from the group consisting of system administration, human resources administration, and procurement management.

22. The method of claim 1, wherein a plurality of displayed attachment pieces have the same shape, thereby providing the user with more than one way to complete the task corresponding to said same shape.

23. The method of claim 1, wherein the tasks include tasks selected from the following: installation of software and configuration of software.

24. The method of claim 15, wherein said inputting includes confirming default settings from the processor.

25. The method of claim 15, wherein the first and second pieces have matching colors prior to said proximity displaying, to aid the user in matching the first and second pieces.

26. The method of claim 15, wherein the first and second pieces have matching images thereon prior to said proximity displaying to aid the user in matching the first and second pieces.

27. The method of claim 15, comprising displaying a plurality of pieces configured to interconnect with the first piece, thereby providing the user with more than one way to complete the task corresponding to the first piece.

28. The method of claim 15, wherein the tasks include tasks selected from the following: installation of software and configuration of software.

29. The method of claim 16, the tasks including tasks selected from the following: installation of software and configuration of software.

30. The method of claim 16, each of the counterpart pieces being configured to interconnect with at least one of the pieces in the tree, wherein each of the counterpart pieces has a shape that corresponds to a type of task, such that when the shape of a given piece in the tree matches the shape of a given counterpart piece, then the given counterpart piece corresponds to a way of completing the task represented by the given piece in the tree.

31. The method claim 30, comprising displaying a plurality of counterpart pieces having the same shape, thereby providing the user with more than one way to complete the task corresponding to said same shape.

* * * * *